United States Patent [19]
Brown et al.

[11] Patent Number: 5,766,468
[45] Date of Patent: Jun. 16, 1998

[54] DUAL MEDIA PRIMARY/SECONDARY FUEL FILTER

[75] Inventors: Gene W. Brown; Steven J. Merritt; David A. Biere, all of Kearney, Nebr.

[73] Assignee: Baldwin Filters, Inc., Kearney, Nebr.

[21] Appl. No.: 779,928

[22] Filed: Jan. 6, 1997

[51] Int. Cl.⁶ .................................................. B01D 27/08
[52] U.S. Cl. .................. 210/323.2; 210/335; 210/438; 210/440; 210/441; 210/450; 210/453; 210/456; 210/493.2
[58] Field of Search ..................... 210/251, 260–262, 210/314–316, 323.2, 335–338, 416.4, 438, 440, 453, 456, DIG. 13, DIG. 17, 252, 257.1, 258, 323.1, 322, 450, 441, 493.2

[56] References Cited

U.S. PATENT DOCUMENTS

| | | |
|---|---|---|
| 3,154,487 | 10/1964 | Thorton et al. ................ 210/438 |
| 3,390,778 | 7/1968 | Uhen ............................. 210/335 |
| 5,217,606 | 6/1993 | Ramponi et al. ............... 210/316 |

*Primary Examiner*—Matthew O. Savage
*Attorney, Agent, or Firm*—Leydig, Voit & Mayer, Ltd.

[57] ABSTRACT

A dual media fuel filter which combines the functions of filtering the fuel passing from a fuel source to a lift pump, and the function of filtering the fuel passing from the lift pump to the fuel injectors. The present invention provides a fuel pump with distinct primary and secondary fuel filter cartridges which are compression loaded into a self-contained oil filter canister adapted for threaded attachment to an engine block. The primary filter cartridge is provided to filter fuel drawn under suction from a fuel source into a lift pump, and is therefore provided with a relatively coarse filtering medium to allow for adequate fuel to pass therethrough even under negative pressure and cold temperature conditions. The secondary filter cartridge is provided with a relatively fine filtering medium to filter the fuel passing from the lift pump and into the fuel injectors.

15 Claims, 6 Drawing Sheets

DUAL MEDIA PRIMARY/SECONDARY FUEL FILTER

FIELD OF THE INVENTION

The present invention generally relates to filters, and more particularly relates to fuel filters for diesel engines.

BACKGROUND OF THE INVENTION

Diesel engines are typically provided with a lift pump which draws fuel from the fuel tank and provides the fuel under positive pressure to an injector pump. The injector pump then provides for sequential injection of the fuel into the individual fuel injectors of the engine for proper timing and combustion. The fuel in such a diesel engine is typically filtered in two distinct locations. A first or primary filter is normally provided upstream of the lift pump, between the fuel tank and the lift pump, to remove relatively large contaminants, and a second or secondary fuel filter is provided downstream of the lift pump between the lift pump and the injector pump to remove finer contaminants which would otherwise reach and detrimentally affect the fuel injectors of the engine.

Since the primary filter is normally operating under suction, a negative, relatively low pressure environment, the primary filtering medium must necessarily be manufactured from a relatively coarse material which provides relatively low flow resistance, but is sufficiently dense to remove large contaminants. This is especially important under cold temperature conditions when the fuel may be particularly viscous and therefore tend to flow less readily. However, the fuel flowing from the lift pump is under a higher, positive pressure and therefore can be forced through the secondary filtering medium, which in turn allows the secondary filtering medium to be made from a relatively fine filtering medium and still enable adequate flow therethrough to reach the engine without stalling.

While such a two-filter system provides for adequate protection from contaminants, it is not without its drawbacks which namely manifest themselves in the form of high manufacturing cost and high maintenance. Since two separate fuel filters are provided, separate plumbing hardware is necessarily required to allow for flow to and from the primary filter, as well as flow to and from the secondary filter. This increases the overall cost of the engine, as well as the space requirements of the engine.

In addition, since there are two filters provided, two filters need to be maintained which causes increased labor costs for removal and replacement of the separate filters. This also requires a maintenance program which assures that both filters are replaced at appropriate intervals. The filtering industry has reduced the labor cost for replacing the filters by providing for "spin-on" filter models, but given that current systems employ two, distinct filters, an unacceptably high amount of time and labor is required for maintenance and replacement of the two spin-on filters.

SUMMARY OF THE INVENTION

It is therefore the primary aim of the present invention to combine the functions of primary and secondary fuel filters into a single, self-contained, dual media fuel filter.

It is an objective of the present invention to provide a simple fuel filter which is able to perform both upstream and downstream filtering functions, i.e., filtering the fuel flowing into the filter from a fuel tank to remove large contaminants and, in addition, filtering the fuel flowing in from a lift pump to remove relatively small contaminants.

It is another objective of the present invention to provide a dual media fuel filter which provides for adequate sealing between the primary and secondary fuel filters as well as between the fuel filters and the housing of the filter even under relatively large pressure differential conditions.

It is yet another objective of the present invention to provide the dual media fuel filter in the form of a spin-on filter design which enables a single fuel filter to be easily and quickly removed and replaced, and to perform both the upstream and downstream filtering.

It is a still further objective of the present invention to provide a fuel filter with flowpaths oriented therein to create a pressure differential which acts as a pressure assist in compressing the primary filter cartridge and secondary filter cartridge and gaskets therebetween to create adequate sealing in the filter, while not destroying the structural integrity of the filter.

It is a still further objective of the present invention to provide the upstream and downstream flow paths with adequate cross-sectional area, and to manufacture the filtering media from sufficiently porous material so that an adequate volume of fuel is supplied to the engine under a range of pressure and temperature conditions, while still providing sufficient filtering of contaminants.

It is a feature of the present invention to accomplish the foregoing by providing the primary fuel filter and the secondary fuel filter in the form of distinct cartridges which are compression loaded into the filter housing and secured therein by a baseplate assembly.

It is another feature of the present invention to accomplish the foregoing to provide a manifold formed with the primary filter cartridge which enables the fuel flowing in from the fuel tank under negative pressure, and the fuel flowing out of the primary filter cartridge to enter and exit the filter at radially inward positions, to allow the fuel flowing from the lift pump under positive pressure to enter the filter in a radially outward position, and to position the secondary filter toward the closed end of the filter housing. The fuel under positive pressure from the lift tank therefore is radially outward from the fuel under negative pressure and must traverse toward the closed end of the filter before passing through the secondary filter. This tends to compress the secondary filter cartridge toward the primary filter cartridge and toward the base plate, to thereby adequately compress the sealing gaskets for enhanced sealing, and prevent the filter cartridges from being biased outwardly and thereby detrimentally affecting the structural integrity of the filter.

It is another feature of the present invention to provide for an efficient method of manufacturing a dual media primary and secondary fuel filter which places the primary and secondary filter cartridges under compression. This is accomplished by assembling the components in the following order: placing the primary filter cartridge on top of the base plate, placing the secondary filter cartridge on top of the primary cartridge, placing a spring on top of the secondary cartridge, and then placing the filter canister over the assembled base plate, primary filter cartridge, secondary filter cartridge, and spring to thereby compress the spring and allow a flange provided at the open end of the canister to be attached to a flange provided on the base plate.

These and other objectives and features of the present invention will become more apparent from the following detailed description when taken in conjunction with the accompanying drawings.

Figure 1:
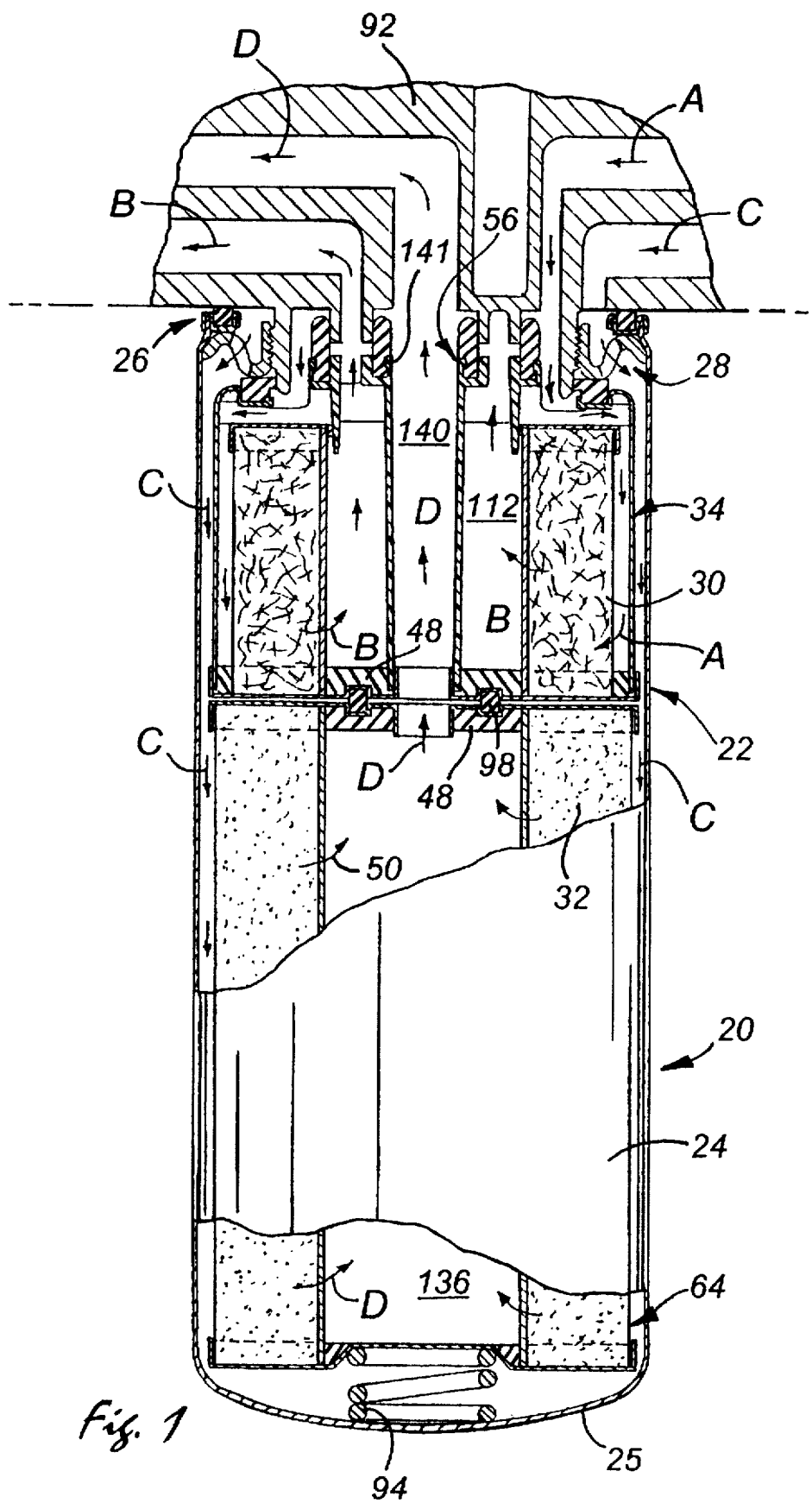
FIG. 1 is a partial cross-sectional view of the present invention with the engine to which the present invention is mounted shown schematically.

While the present invention is susceptible of various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

Referring first to FIG. 1, filter 20 is shown having an outer appearance typical among spin-on type filters. That is to say that filter 20 includes canister 22 having a generally cylindrical side wall 24 and an end wall 25 which closes one end of canister 22 to give the filter a conventional outer appearance. The canister is preferably drawn from sheet steel, and is provided with an open end 26 opposite end wall 25. Canister open end 26 is closed with a base plate assembly 28 which includes a mechanism for threadably attaching the filter to an engine block as will be described with further detail herein.

Although the outer appearance of the present invention is rather conventional, FIG. 1 also shows that the internal construction of filter 20 provides a novel arrangement of primary filter 30 and secondary filter 32 in the form of two completely independent filter elements, i.e., primary filter cartridge 34 and secondary filter cartridge 64, held within canister 22 by baseplate assembly 28. The structure and functionality of each of these components will be discussed individually in the following description.

One of the challenges in designing a fuel filter which combines the primary filtering medium with a secondary filtering medium is the design of the flow circuits through the filter which allow adequate fuel to not only be filtered but also to feed the engine and therefore not starve the engine. In addition, since the fuel flowing into the primary filter is under suction or low, negative pressure, and the fuel flowing to the secondary filter is under relatively high, positive pressure or compression, it is necessary to design the flow paths such that the filter is not forced apart, but rather lends itself towards creating a compressed, sealed, self-contained unit.

Figure 2:
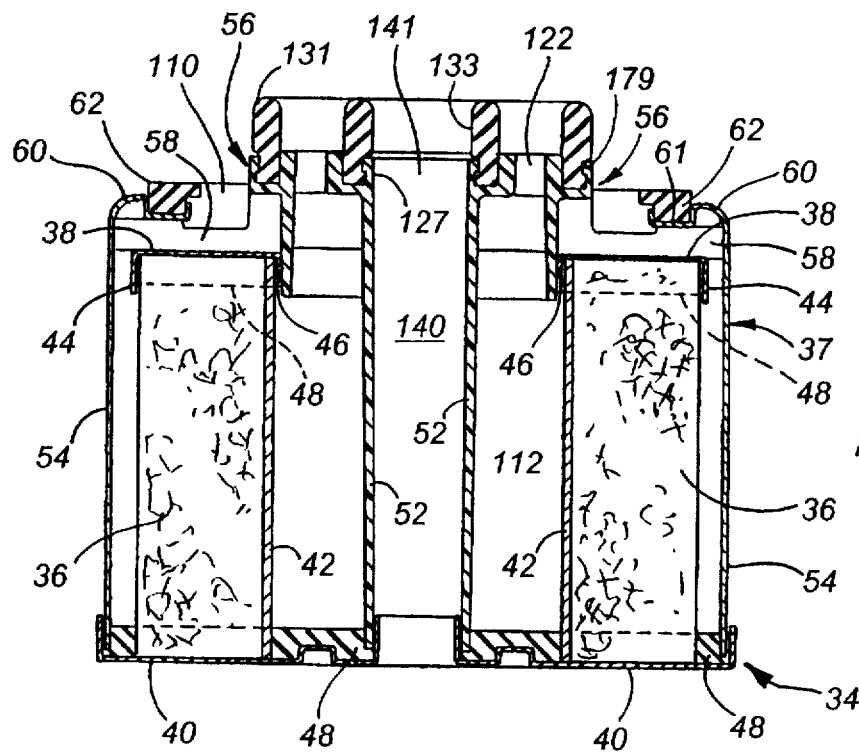
FIG. 2 is an enlarged cross-sectional view of the primary filter cartridge.

In accordance with these objectives, the primary filter cartridge 34 is configured as shown in FIG. 2. Primary filter cartridge 34 not only includes paper filter medium 36, but also provides filter medium 36 within an enclosure 37 which is attached to manifold 56. This enables the primary filter cartridge to be formed complete with flowpaths to and from the filtering medium 36 prior to the ultimate assembly of filter 20 as a whole, and provides a completely separate axial flowpath therethrough for fluid communication between secondary filter cartridge 64 and the engine. The base plate 28 and manifold 56 together define a ported closure for closing the open end 26 of the canister 22.

As shown in FIG. 2, filter medium 36 is contained between first end cap 38 and second end cap 40, is annularly shaped, and includes an inner diameter having a tubular member 42 therein provided with a plurality of apertures for allowing passage of fuel therethrough away from filter medium 36. In one practical implementation of the invention, primary filter medium is preferably made from pleated paper having a total of 78 pleats and a total filtering area of 292.5 inches; other sizes, and other materials including metal screen could be employed. To provide structure integrity to primary filter cartridge 34, tubular member 42 extends substantially the length of paper filter medium 36. First end cap 38 is provided with flanges 44 and 46 at a distance sufficient to engage the outer diameter of paper filter medium 36 and tubular member 42 respectively. A potting compound 48 is then provided at a depth sufficient to seal paper filter medium 36, tubular member 42, first end cap 38, and tapered end 139 of manifold arm 135 together. In the preferred embodiment, plastisol is employed as the potting compound, but it is to be understood that in alternative embodiments, other sealants and potting compounds could be used.

Second end cap 40 is similarly provided with potting compound 48 to seal the other end of primary filter cartridge 34. However, second end cap 40 additionally cooperates with manifold tube 52, and exterior can 54 to provide the seal. As can best be seen from FIG. 2, second end cap 40 is provided at a substantially greater diameter than first end cap 38 and exterior can 54 is provided with an outer diameter substantially equal to the outer diameter of second cap 40. In addition, first end cap 38, second end cap 40, tubular member 42, and exterior can 54 are all manufactured from sheet steel in the preferred embodiment, while manifold 56 is manufactured from plastic. As best shown in FIG. 2, first end cap 38 is provided adjacent end plate 58 of manifold 56 and exterior can 54 wraps around end plate 58. By curing the potting compound 48 of second end cap 40, and wrapping exterior can 54 around end plate 58, primary filter cartridge 34 is formed into a self-contained unitary piece. It can further be seen from FIG. 2 that sealing flange 60 of exterior can 54 is provided with annular groove 61 shaped to frictionally engage annular sealing ring 62 therein. Sealing ring 62 is adapted to engage baseplate assembly 28 and can be manufactured from any suitable elastomeric sealing material, such as neoprene.

As mentioned, supra, one of the challenges in designing such a dual media filter is to create flowpaths within the filter which are not only provided with a cross-sectional area large enough to allow sufficient fuel to pass therethrough for feeding the engine, but which are also arranged so as to create a pressure differential across the filter which acts as a pressure assist in compressing the filters and gaskets therebetween. To a great extent, these objectives are accomplishes through the novel use of manifold 56, shown in detail in FIGS. 4 and 5, and by providing manifold 56 with appropriately positioned openings for communication of the fuel to and from the filter.

Figure 4:
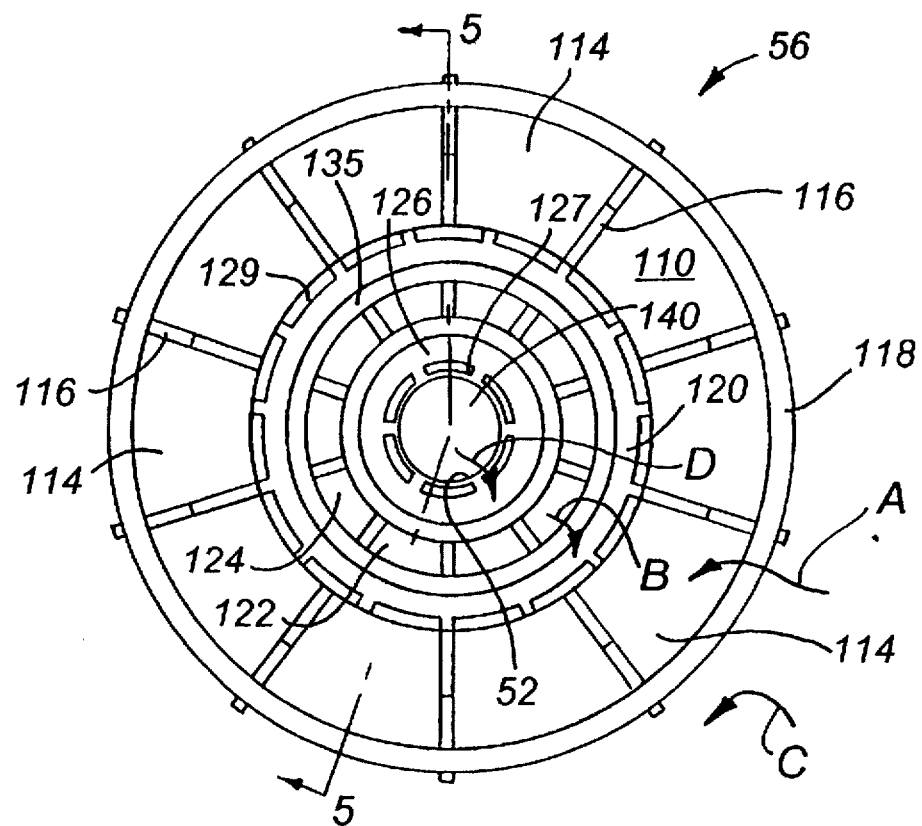
FIG. 4 is a bottom view of the manifold.
Figure 5:
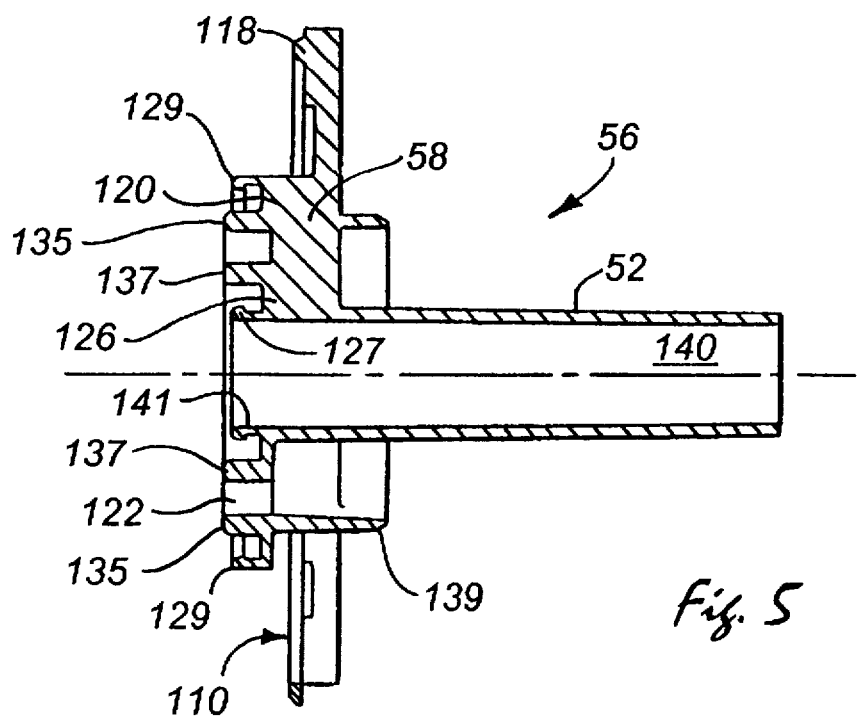
FIG. 5 is a cross-sectional view of the manifold taken along the line 5—5 of FIG. 4.

First of all, fuel enters primary filter cartridge 34 from a fuel tank (see FIG. 6) through inlets 110 provided in manifold 56 and passes between the inside surface 55 of exterior can 54 and flange 44 of first end cap 38 as shown by directional arrow A, before passing through paper filter medium 36 and into plenum 112 of primary filter cartridge 34. As shown in FIG. 4, inlet 110 is comprised of a plurality of openings 114 provided radially about end plate 58 of manifold 56. Each opening 110 is separated by a support beam 116 and is located between outer support ring 118 and median support ring 120. As best shown in FIG. 4, outer support ring 118 is concentric with median support ring 120, and is provided with a substantially greater diameter.

After passing through filtering medium 36, fuel passes from plenum 112 and out of filter 20, as shown by directional arrow B through outlet 122 also provided in manifold 56. Similar to inlet 110, outlet 122 is provided in the form of a plurality of circumferentially disposed openings 124 separated by support beams 116. Openings 124 are provided between median support ring 120 and inner support ring 126. Inner support ring 126 is provided with a plurality of elastically deformable lips 127 which allow manifold 56, which is formed by injection molding, to be more easily removed from a mold after being formed, and which cooperate with wall 135 and to hold annular gasket 133. Similarly, median support ring 120 includes a plurality of elastically deformable lips 129 which facilitate removal from a mold and which cooperate with wall 135 to hold annular gasket 131.

Figure 3:
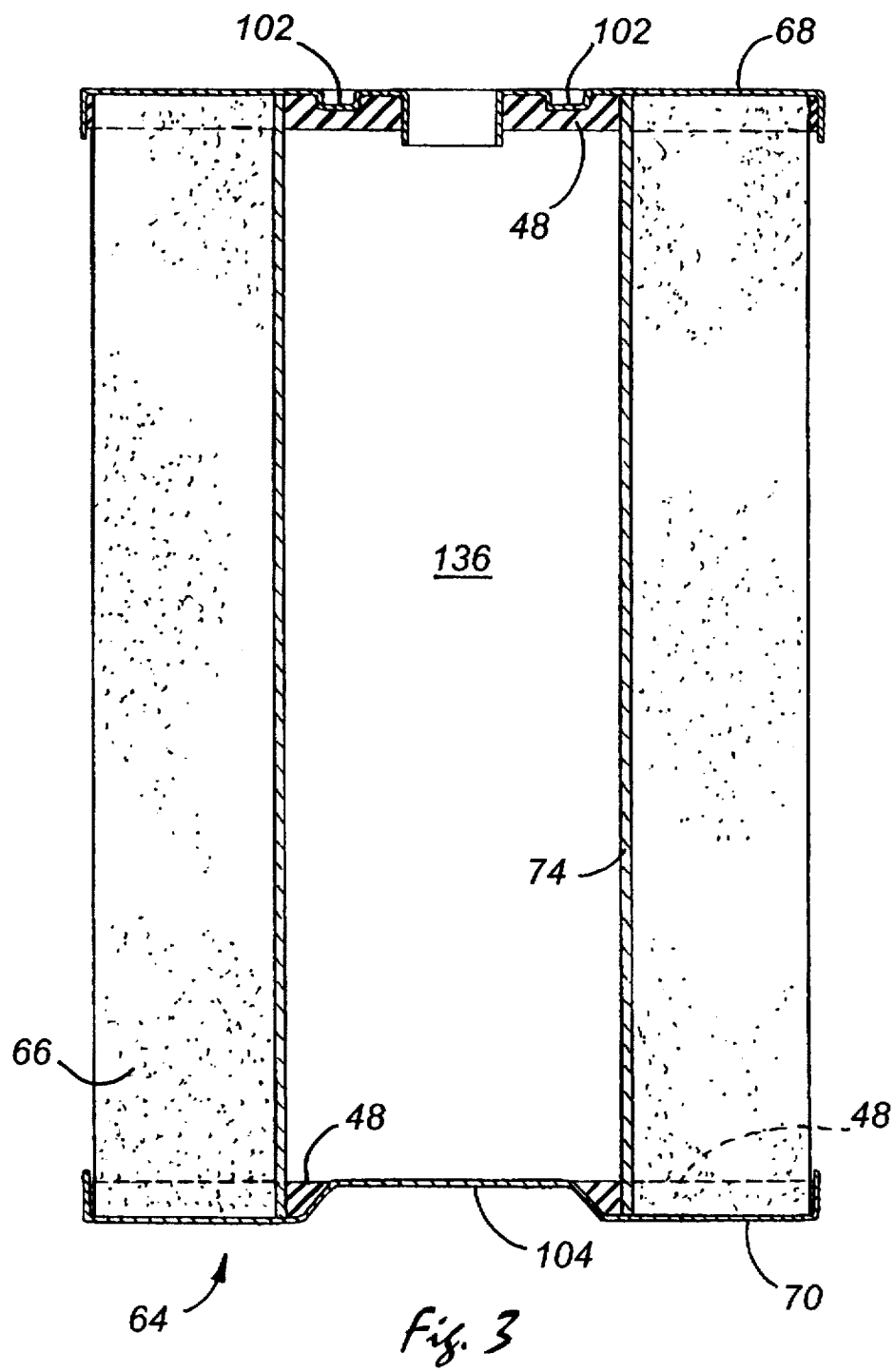
FIG. 3 is an enlarged cross-sectional view of the secondary filter cartridge.

Although the aforementioned description provides structure by which the fuel is initially filtered, the creation of flowpaths to and from the primary filter cartridge 34 is only one demand of a dual media filter. The primary filter enables the fuel from the tank to be initially filtered before entering a lift pump, but additional means are necessary for finer filtering before the fuel can be communicated to the injectors. This finer filtering is provided in the form of secondary filter cartridge 64, shown in detail in FIG. 3. Secondary filter cartridge 64 is provided with a paper filter medium 66 contained between third end cap 68 and fourth end cap 70. Both third end cap 68 and fourth end cap 70 are provided with potting compound 48 as a sealant. In addition, similar to primary filter cartridge 34, tubular member 74 is provided at the inner diameter of paper filter medium 66 which extends from third end cap 68 to fourth end cap 70.

In the preferred embodiment, secondary paper filter medium 66 is formed with a total of 67 pleats and provides 770.5 square inches of cross sectional area through which the fuel is filtered. However, it is to be understood that alternative embodiments could certainly include secondary filtering mediums made from different material and provided at different dimensions and configurations. Similar to primary filter cartridge 34, secondary filter cartridge 64 is manufactured by providing annular paper filter medium 66 about tubular member 74 and disposing third annular metal end cap 68 at one end and fourth annular metal end cap 70 at the other end. Third end cap 68 and fourth end cap 70 are both provided with potting compound 48 which is then cured to provide self-contained, tubular-shaped secondary filter cartridge 64.

Figures 8A, 8B:
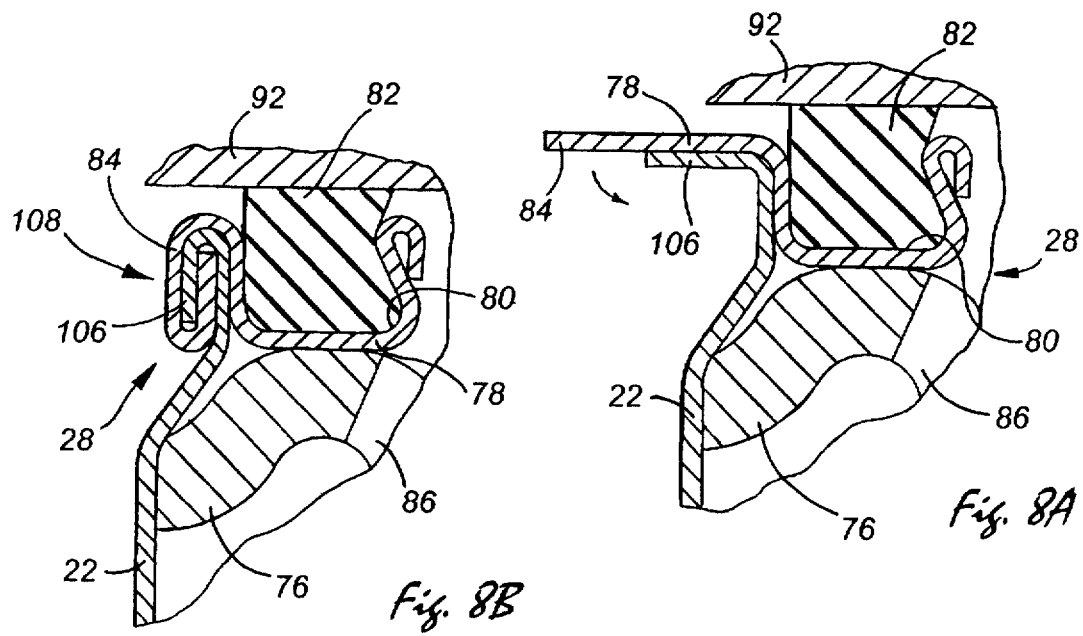
FIG. 8a is a fragmentary, sectional view showing the canister flange and baseplate flange prior to being seamed together.
FIG. 8b is a fragmentary, sectional view showing the canister flange and baseplate flange seamed together.
Figure 6:
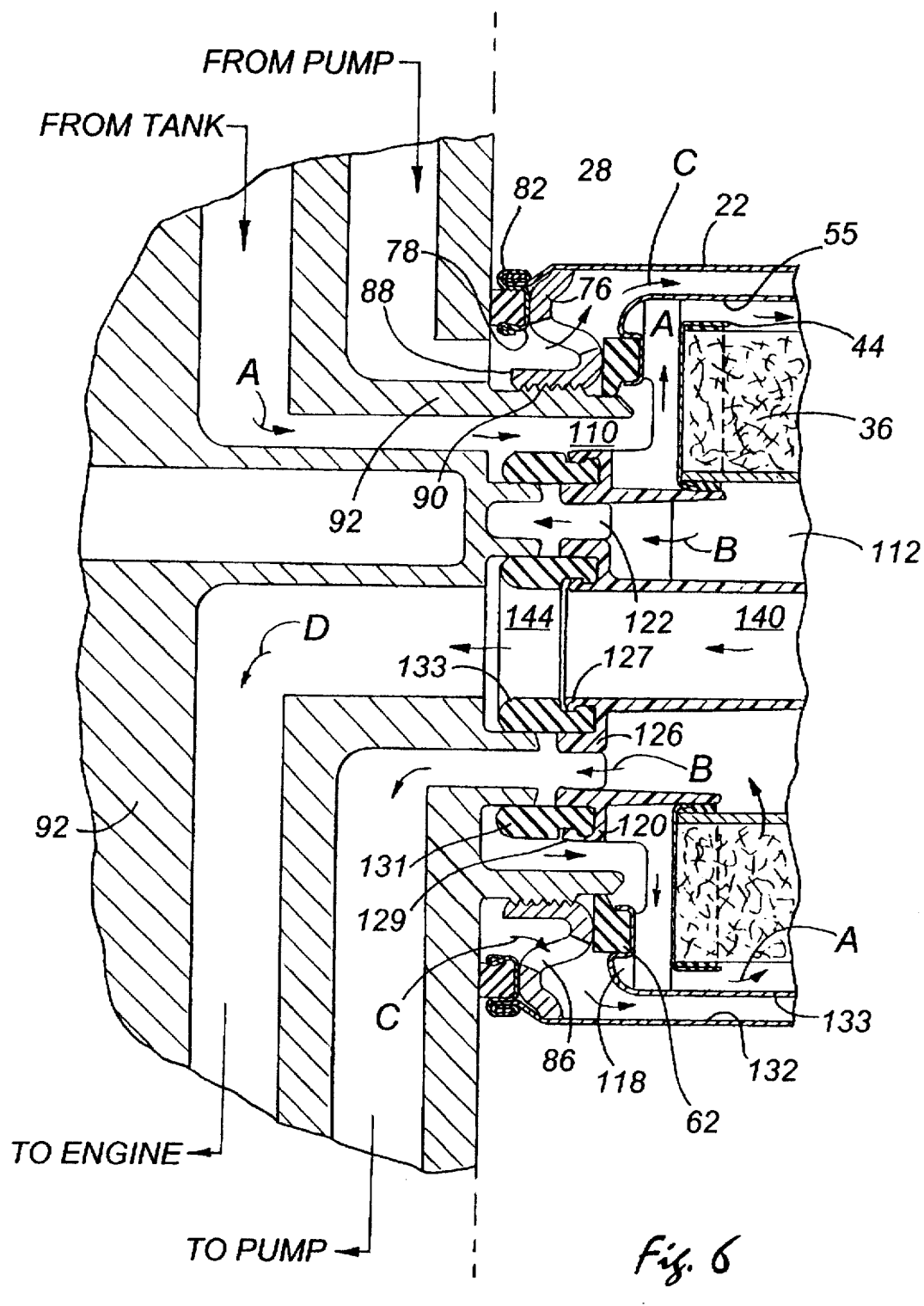
FIG. 6 is an enlarged fragmentary cross-sectional view of the assembled filter shown in FIG. 1 rotated 90° and specifically showing the base plate, manifold, and flow paths to and from the filter.

Before the method by which fuel is communicated to and from secondary filter cartridge 64 is described, base plate assembly 28, shown in detail in FIG. 6, must be understood. It is baseplate assembly 28 which cooperates with manifold 56 to create the necessary flowpaths to and from secondary filter cartridge 64. Baseplate assembly 28 and is comprised primarily of metal base plate 76 to which metal seaming lid 78 is welded. Seaming lid 78 is preferably manufactured from sheet metal and formed within annular groove 80 sized sufficiently to receive outer gasket 82 and in the preassembled state shown best in FIG. 8a, is provided with a radially extending flange 84 for attachment to open end 26 of canister 22 as will be described with further detail herein. Base plate 76 is provided with a plurality of apertures 86 which allow the fuel to be filtered to pass therethrough. Base plate 76 is also provided with annular rim 88 which is provided with a plurality of threads 90 adapted for attachment to the engine block shown schematically at 92.

It can therefore be seen that when filter 20 is attached to an engine, fuel from the lift pump passes under relatively high positive pressure to secondary filter 32, as shown by directional arrow C, through apertures 86 provided in baseplate 56 (See FIG. 6). In the preferred embodiment, eight apertures 86 are provided circumferentially around base plate 76 although a different number of apertures are certainly possible. From apertures 86, fuel passes between the inner surface 132 of canister 22 and the outer surface 133 of exterior can 54. Since primary filter cartridge 34 is sealed, the fuel cannot enter the primary filter cartridge and since primary filter cartridge 34 is separated from the secondary filter cartridge 64 by interior sealing gasket 98, the fuel from the lift pump passes directly into the secondary filter cartridge 64 as best shown in FIG. 1. As shown by directional arrow D, fuel passes directly through paper filter medium 66 and into inner plenum 136 through apertures 138 provided in tubular member 74. From inner plenum 136, fuel passes into reduced plenum 140 provided in the inner diameter of primary filter cartridge 34 and from there into the engine (shown schematically) through outlet 141. In actual practice, the fuel would then pass to an injector pump which would sequentially inject fuel to the fuel injectors for proper timing of engine operation.

It can therefore be seen that the fuel under positive pressure enters into filter 20 at the extreme outer diameter of the filter and toward end wall 25 before exiting the filter through the center. On the other hand, the fuel under negative pressure enters filter 20 toward the inner diameter of filter 20 toward the open end 26 of filter 20 and radially inward from the high, positively pressured fuel coming from the lift pump. This positive pressure therefore creates a pressure differential across filter 20 which tends to compress the two filter cartridges and acts in concert with the biasing force of spring 94 to bias the filters towards base plate 76. This not only provides a pressure assist in adequately compressing the gaskets throughout the filter 20 and thereby providing proper sealing, but also prevents the filter cartridges from being biased outwardly and potentially damaging filter 20. For example, if the primary filter were to be positioned toward end wall 25 and the negative pressure flow path were to be placed on the outer diameter of canister 22, and the secondary filter cartridge were placed toward open end 26 with the positive pressure on the inside, the positive pressure would therefore act in a radially outward direction, and tend not only to resist the compressing bias of spring 94, but also tend to cause canister 22 to move outward and potentially be damaged.

Figure 7:
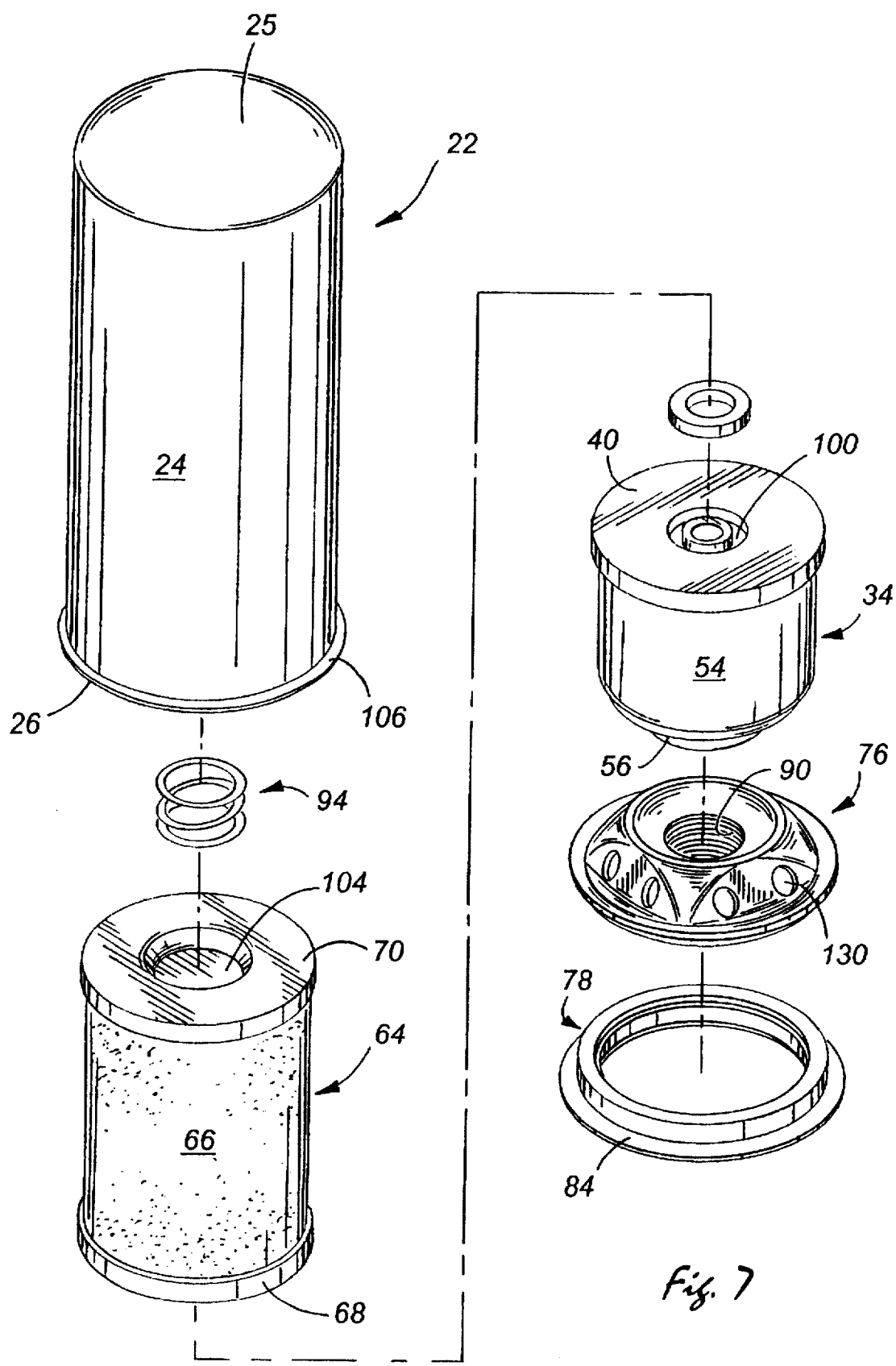
FIG. 7 is an exploded view of a filter embodying the present invention.

The inventive features of the present invention also encompass the efficient method by which the self-contained, sealed, pressure-assisted, dual-media filter 20 is manufactured. In an effort to explain that method, reference is now made to FIGS. 7, 8a, and 8b in particular. Since all the above-referenced components are contained within canister 22 and biased outwardly by bias spring 94 it is necessary to compress spring 94 before radial flange 84 of seaming lid 78 is in the proximity of circumferential flange 106 of canister 22 for seaming of the two metal components.

The present invention is therefore assembled in the following manner. After base plate 76 is welded to seaming lid 78, base plate assembly 28 is placed on a work surface (not shown) such that seaming lid 78 rests on the work surface and base plate 76 projects upwardly. Primary filter cartridge 34 is then placed on top of base plate assembly 28 such that annular sealing ring 62 rests on top of base plate 76 and second end cap 40 projects upwardly. An interior sealing gasket 98 is then provided in annular groove 100 of second end cap 40. Secondary filter cartridge 64 is then placed on top of primary filter cartridge 34 such that third end cap 68 is adjacent second end cap 40. Third end cap 68 is similarly provided with annular groove 102 to receive interior sealing gasket 98 therein. Fourth end cap 70 therefore projects upwardly, and as shown best in FIG. 1, and is provided with an interior recess 104 having an outer diameter sufficient to receive spring 94. Spring 94 is then placed inside of interior recess 104 and canister 22 is then lowered on top of the assembly. End wall 25 engages spring 94 and compresses spring 94 to an extent sufficient to allow circumferential flange 106 to abut radial flange 84 of seaming lid 78 as best shown in FIG. 8a. The abutting flanges 84 and 106 are then seamed together in a conventional manner resulting in a rolled seam 108 as best shown in FIG. 8b.

Filter 20 is thereby provided in a self-contained unit wherein secondary filter cartridge 64 is biased in the direction of primary filter cartridge 34, which in turn is biased in the direction of base plate assembly 28. Since base plate assembly 28 is provided with threads 90, filter 20 can be easily attached via rotation to the engine block 92 of an engine, and removed with similar ease.

From the foregoing it can be seen that the present invention provides a fuel filter which combines the functions of a primary filter and the functions of a secondary filter into a single, self-contained unit. This is in opposition to primary art arrangements wherein separate primary and secondary filters would be provided and therefore separate plumbing to and from the engine and lift pump would therefore need to be provided. Such prior devices not only increase the resulting cost of the engine and filtering equipment, but also increase the required maintenance in that two separate filters not only have to be maintained in supply, but periodically replaced.

The present invention, on the other hand, allows for a single filter to combine the functions of filtering the fuel coming from the fuel tank and entering the lift pump, and filtering the fuel leading from the lift pump and into the injection pump and injectors. Given the viscosity of fuel under cold temperature conditions, and the fact that the fuel is entering the lift pump under low, negative pressure, (approximately −3 psi) the filtering medium between the fuel tank and the lift pump needs to be relatively coarse to allow for a large cross-sectional flow area. This will remove relatively large contaminants to protect the lift pump, while still allowing adequate fuel to enter the lift pump even under cold conditions when the fuel is viscous.

After exiting the lift pump, the fuel will necessarily be warmer and less viscous, and under increased positive pressure (approximately 70 psi). The secondary filter can therefore be manufactured from a finer filtering medium to allow the fuel to be forced therethrough. This finer filtering medium will be able to remove relatively small contaminants which is essential for proper operation of the fuel injectors which have relatively tight machine tolerances and which cannot accept large contaminants. After the service life of the filter has expired, filter 20 can be simply removed by rotating filter 20 with respect to the threaded bob of the engine block and installing a new one.

The present invention therefore provides a more compact, more cost effective, better sealed, and more efficient fuel filter which combines the functions of conventional primary and secondary fuel filters into a single, self-contained unit.

What is claimed is:

1. A spin-on fuel filter for filtering fuel in two separate fuel circuits, comprising in combination:

a canister having a closed end, an open end, and a longitudinal axis between the closed end and the open end;

a ported closure for closing the canister open end;

a primary and a secondary filter element axially aligned in the canister with the secondary filter element adjacent the closed end;

the primary filter element having a closed external periphery for providing a first fluid passage between the flange and the secondary filter element, the primary filter element having an inlet and an outlet;

the primary filter element also having a tubular axial passage therethrough for providing a second fluid passage for fuel flow between the secondary element and the flange; and said ported closure having isolated first, second, third, and fourth ports, the first port being connected to the first passage, the second port being connected to the second passage, the third port being connected to the primary filter element inlet, and, the fourth port being connected to the primary filter element outlet.

2. The dual media fuel filter of claim 1 wherein the secondary filter cartridge includes first and second end caps attached to the filtering medium with a potting compound.

3. A dual media fuel filter, comprising:

a canister having a cylindrical outer wall, a closed end, and an open end;

a primary filter cartridge disposed in the canister proximate the open end, the primary filter cartridge including a filtering medium and a manifold, the filtering medium being contained within an enclosure having an inlet and an outlet, the manifold having a first orifice in fluid communication with the enclosure inlet, and a second orifice in fluid communication with the enclosure outlet;

a secondary filter cartridge disposed in the canister between the primary filter cartridge and the canister closed end, the secondary filter cartridge having an inlet and an outlet, the secondary filter cartridge outlet being in communication with a third orifice of the manifold; and a baseplate assembly attached to the open end of the canister, the baseplate assembly having an opening in fluid communication with the secondary filter cartridge inlet.

4. The dual media fuel filter of claim 3 further including a first gasket between the baseplate assembly and the primary filter cartridge, a second gasket between the primary filter cartridge and the secondary filter cartridge, and a spring between the secondary filter cartridge and the canister closed end, the spring imparting a biasing force tending to force the secondary filter cartridge toward the primary filter cartridge and the primary filter cartridge toward the baseplate assembly to compress the first gasket and the second gasket for enhanced sealing.

5. The dual media fuel filter of claim 4 further including a first flow path from the manifold first orifice to the primary filtering medium, a second flow path from the primary filtering medium to the manifold second orifice, a third flow path from the baseplate assembly opening to the secondary filtering medium, and a fourth flow path from the secondary filtering medium to the manifold third orifice, the first and second flow paths conducting fuel under negative pressure, the third and fourth flow paths conducting fuel under positive pressure, the positive pressure third flow path being disposed radially outward of the first and second flow paths and extending toward the closed end of the canister to thereby assist the spring in compressing the primary filter cartridge, the secondary filter cartridge, and the first and second gaskets.

6. The dual media fuel filter of claim 3 wherein the manifold first, second, and third orifices and the baseplate opening are annularly shaped, and concentrically arranged, with the third orifice being centrally located, the second orifice being located radially outward from the third orifice, the first orifice being radially outward from the second orifice, and the baseplate opening being radially outward from the first orifice.

7. The dual media fuel filter of claim 3 wherein the primary filter cartridge enclosure is attached to the filtering medium with a potting compound.

8. A dual media fuel filter for a diesel engine, comprising:
a canister having a closed end and an open end;
a primary filter disposed in the canister;
a secondary filter disposed in the canister;
a manifold attached to the open end, the primary filter and secondary filter being positioned between the manifold and the closed end, the manifold including an inlet for communicating fuel from a fuel source to the primary filter, an outlet for communicating fuel from the primary filter to a pump, an inlet for communicating fuel from the pump to the secondary filter, and an outlet for communicating fuel from the secondary filter to the engine; and
means for attaching the filter to the engine, the attachment means located adjacent the open end of the canister.

9. The dual media filter of claim 8, wherein the primary filter includes a relatively coarse filter medium to remove contaminants from the fuel flowing from the fuel source to the pump.

10. The dual media filter of claim 8, wherein the secondary filter includes a relatively fine filter medium to remove contaminants from the fuel flowing from the pump to the engine.

11. The dual media filter of claim 8, wherein the primary filter is disposed adjacent the manifold and the secondary filter is disposed between the primary filter and the closed end of the canister.

12. The dual media filter of claim 11, wherein the primary filter is annular and is journalled within first and second metal end caps, the secondary filter is annular and is journalled within first and second metal end caps, an exterior can and an extended central tube of the manifold, the first end cap of the primary filter engaging the manifold, the exterior can extending from the second end cap of the primary filter to the manifold and attaching to the manifold, the central tube of the manifold extending to the second end cap of the primary filter.

13. The dual media filter of claim 12, wherein the filter further includes a spring positioned between the secondary filter second end cap, and the closed end of the canister, and the attachment means is a mounting base adjacent the manifold, the canister being attached to the mounting base, the spring biasing the secondary filter toward the primary filter, the primary filter toward the manifold, and the manifold toward the mounting base.

14. The dual media filter of claim 13, wherein the mounting base includes a threaded aperture for attachment of the filter to a mating hub of the engine.

15. The dual media filter of claim 8, wherein the manifold is a disc-shaped body having first, second, and third concentrically disposed annular support rings wherein the outlet of the engine is disposed within the first ring, the outlet to the pump is disposed between the first ring and the second ring, the inlet to the primary being disposed between the second ring and the third ring, and the inlet to the secondary filter being disposed between the third ring and the canister, the fuel flowing in from the tank and out to the pump being under negative pressure, the fuel flowing from the pump and to the engine being under positive pressure, the two negative pressure flow paths being disposed between the two positive pressure flow paths to thereby create a pressure differential across the primary and secondary filters tending to compress the filters and enhance the sealing therein.

* * * * *